United States Patent
Rosenbalm et al.

(10) Patent No.: US 6,718,743 B2
(45) Date of Patent: Apr. 13, 2004

(54) CONVERGING DRUM FOR MOWER-CONDITIONER EQUIPPED WITH A ROTARY DISC CUTTER BAR

(75) Inventors: Allan Wesley Rosenbalm, Blakesburg, IA (US); Michael Joseph Verhulst, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/353,128

(22) Filed: Jan. 28, 2003

(65) Prior Publication Data

US 2003/0110751 A1 Jun. 19, 2003

Related U.S. Application Data

(62) Division of application No. 09/884,333, filed on Jun. 19, 2001, now Pat. No. 6,581,362.

(51) Int. Cl.[7] ................................................ A01D 75/30
(52) U.S. Cl. ................................................ 56/6; 56/13.6
(58) Field of Search .................... 56/6, 13.6, 255, 56/16.6, 295

(56) References Cited

U.S. PATENT DOCUMENTS

| | | | |
|---|---|---|---|
| 3,462,927 A | 8/1969 | Quick | 56/56 |
| 3,772,865 A | 11/1973 | Ruprecht et al. | 56/192 |
| 4,094,132 A | 6/1978 | Decoene et al. | 56/14.4 |
| 4,160,356 A | 7/1979 | Mathews | 56/192 |
| 4,212,143 A | 7/1980 | Chaumont | 56/14.4 |
| 4,238,917 A | 12/1980 | Oosterling et al. | 56/192 |
| 4,244,163 A | 1/1981 | Gantzer et al. | 56/192 |
| 5,107,663 A | 4/1992 | Wattron et al. | 56/15.7 |
| 5,433,064 A | 7/1995 | Schmitt et al. | 56/6 |
| 5,768,865 A | 6/1998 | Rosenbalm et al. | 56/6 |
| 5,842,330 A | 12/1998 | Richardson et al. | 56/6 |
| 5,852,921 A | 12/1998 | Neuerburg et al. | 56/6 |

FOREIGN PATENT DOCUMENTS

EP          0753246 A1    1/1997

*Primary Examiner*—Árpád Fab Kovács (57) ABSTRACT

A mower-conditioner includes a header or platform which is equipped with a rotary disc cutter bar having a relatively long length with at least two cutting units being outboard of a central discharge passage where a pair of conditioner rolls are mounted for receiving the cut crop. Aiding in conveying crop to the discharge passage are right- and left-hand sets of three crop converging drums provided at each side of the discharge passage. The outer drums of the two sets are respectively mounted to the top of the right- and left-hand end cutting units of the cutter bar while the other two drums on each side are located behind an inward and rearward extending line that is tangent to the cylindrical path traced by the outer and inner ones of the drums on each side of the discharge passage. In one embodiment, a direct drive transmission is provided, and in a second embodiment a hydraulic motor is provided, for driving the inner two converging drums of each set.

3 Claims, 7 Drawing Sheets

CONVERGING DRUM FOR MOWER-CONDITIONER EQUIPPED WITH A ROTARY DISC CUTTER BAR

This application is a divisional application of application Ser. No. 09/884,333, filed Jun. 19, 2001, now U.S. Pat. No. 6,581,362, granted Jun. 24, 2003.

The present invention relates to a crop converging arrangement for mower-conditioners, and more specifically relates to crop converging arrangement associated with a rotary cutter bar of a mower-conditioner.

BACKGROUND OF THE INVENTION

U.S. Pat. No. 5,842,330, granted Dec. 1, 1998, discloses a mower-conditioner equipped with a rotary cutter bar that includes a pair of converging drum at each of its opposite ends, with each pair of drums cooperating with a converging shield structure to converge cut crop to a narrower stream that is fed to the rear into a conditioning arrangement. This type of converging structure does not satisfactorily converge crop, especially when used with a longer cutter bar for cutting a wider swath of crop.

U.S. Pat. No. 5,433,064, granted Jul. 18, 1995, discloses a mower-conditioner equipped with a rotary cutter bar that is relatively long and includes a pair of driven converging drums arranged above the two outermost cutting units at each end of the cutter bar and used together with a driven converging element located between them. The pair of converging drums and intermediate converging element are all located in line with the centers of rotation of the cutting discs and in this position are found to cause the cut crop transported by them to the conditioner to interfere with the uncut crop so that it is bent over and is not cleanly cut off.

SUMMARY OF THE INVENTION

According to the present invention there is provided an improved converging drum a crop converging arrangement and a conditioner arrangement of a mower-conditioner equipped with a rotary disc cutter bar.

An object of the invention is to provide a crop converging drum defining a plurality of crop-engaging ribs defined by angle members and gap filler plates extending between upper and lower plates.

A more specific object of the invention is provide a converging drum, as defined in the immediately preceding object, wherein the angle members have legs defining a right angle, and wherein the filler plates overlap the legs of the angle members and define ribs located half way between the right angles defined by the angle members.

These and other objects of the invention will become apparent from a reading of the ensuing description together with the appended drawings.

DESCRIPTION OF THE PREFERRED EMBODIMENT

Preliminarily, it is to be noted that while some structure may be stated as occurring in pairs, only one of the pair may be shown with it to be understood that the other of the pair is identical or a mirror image of the one shown.

Figure 1:
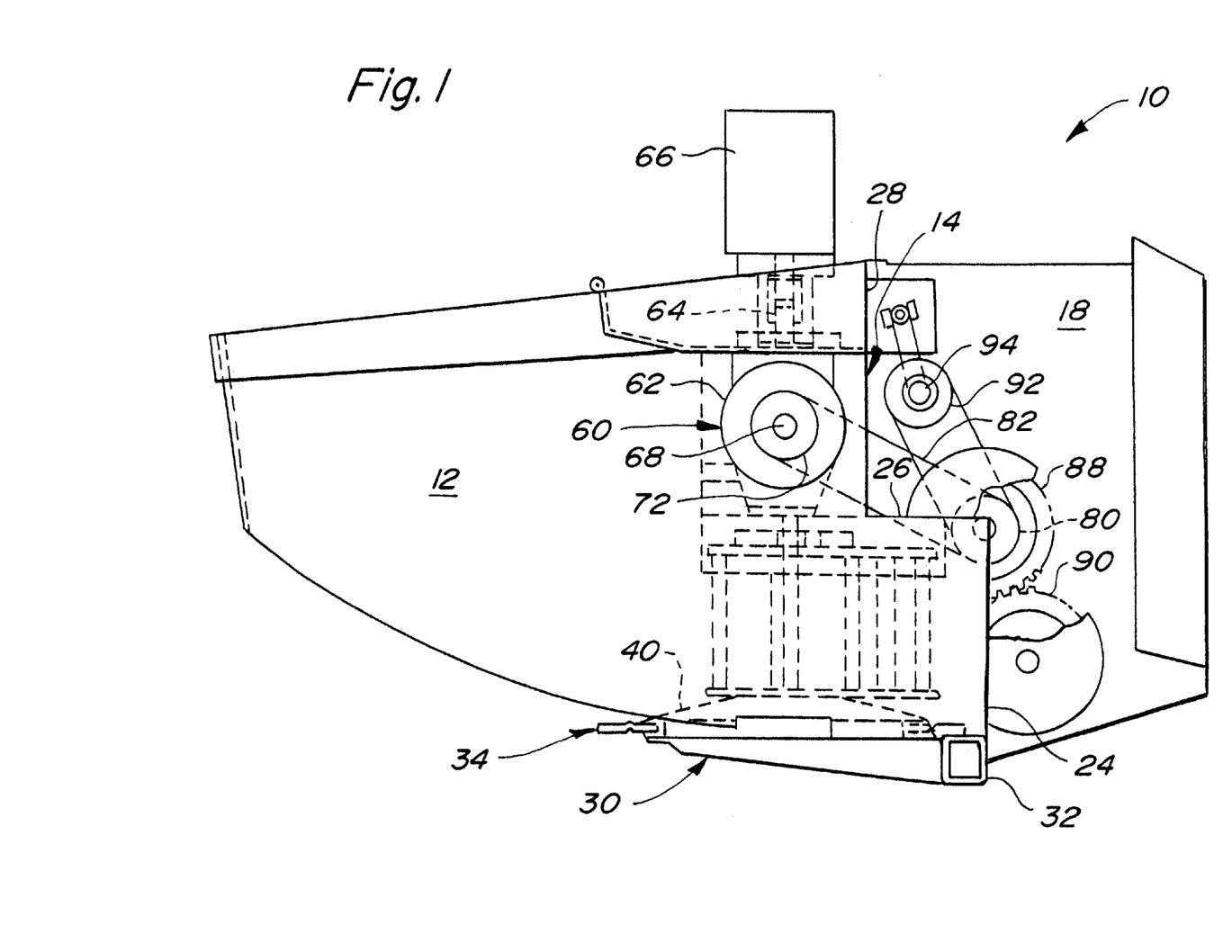
FIG. 1 is a schematic left side elevational view of a mower-conditioner platform, of the roll conditioner type, having a crop converging drum arrangement constructed in accordance with the present invention and showing a portion of the drive for the cutter bar, conditioner rolls and converging drums.
Figure 2:
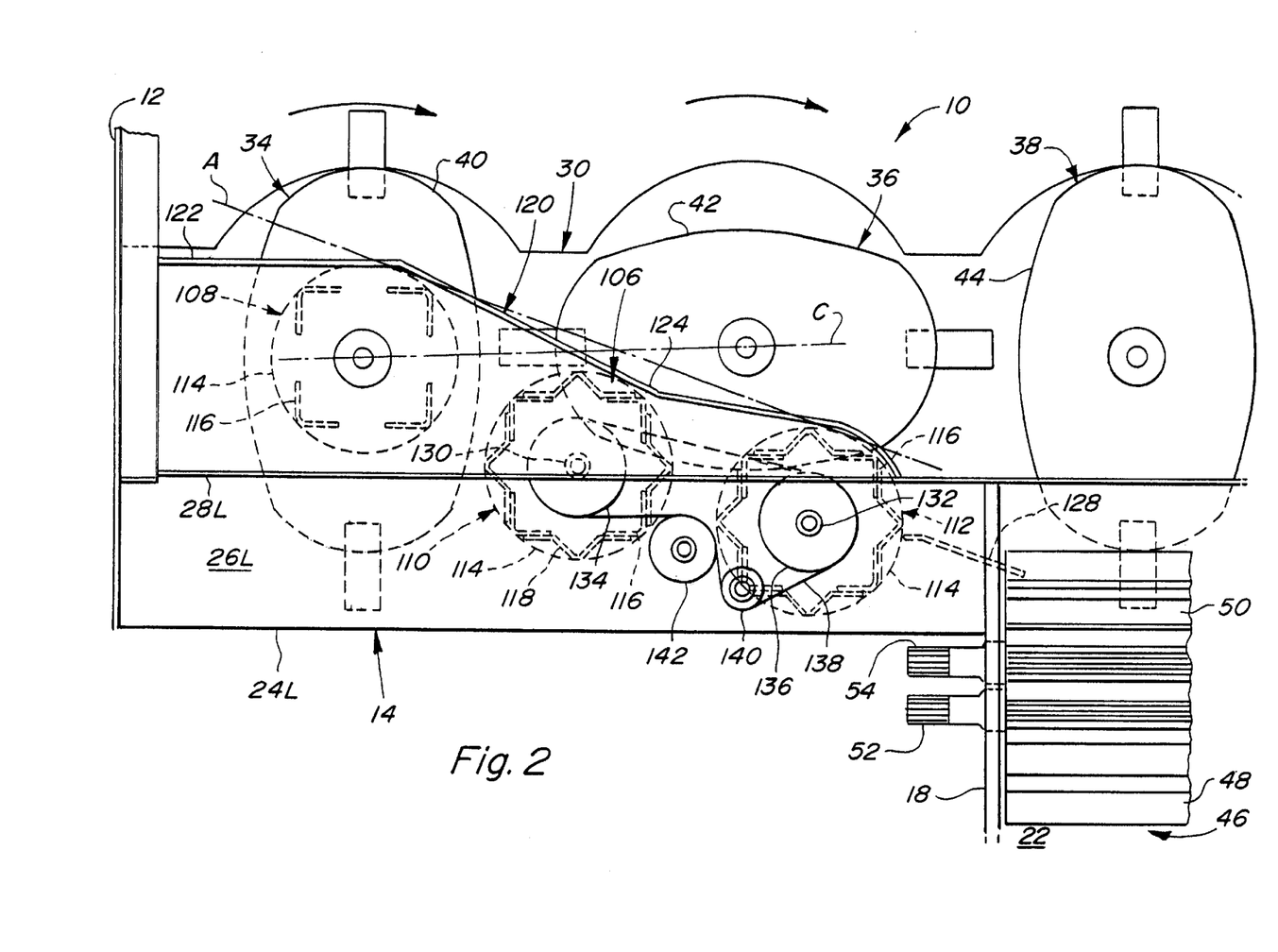
FIG. 2 is a somewhat schematic top plan view of the left-hand portion of the mower-conditioner platform showing the relationship between the cutter bar and the left-hand set of converging drums.

Referring now to FIGS. 1 and 2, a part of a mower-conditioner header or platform 10 is shown including a body defined by right- and left-hand side walls, of which only the left-hand side wall 12 is shown. Left- and right-hand upright transverse walls or bulkheads 14 and 16 (FIG. 7), respectively, extend inwardly from the side walls. The left- and right-hand bulkheads 14 and 16 respectively terminate inwardly at the forward ends of left- and right-hand, upright, fore-and-aft extending inner side walls 18 (FIG. 2) and 20 (FIG. 7), respectively. The left- and right-hand inner side walls 18 and 20 define a crop discharge passage 22 between them. While the bulkheads could be various upright configurations without departing from the present invention, they are here shown as including respective vertical lower sections 24L and 24R, horizontal middle sections 26L and 26R, and vertical upper sections 28L and 28R.

An elongate rotary cutter bar 30 extends between the left-hand side wall 12 and the right-hand side wall. Extending the length of, and defining a rear portion of, the cutter bar 30 is a stiffener beam 32 of square cross section that is bolted to lower portions of the pair of lower bulkhead sections 24L and 24R. While the present invention could be advantageously applied to rotary cutter bars of various constructions, the cutter bar 30 is a known type containing a plurality of intermeshed spur gears (not shown), including idler and drive gears coupled for effecting rotation of respective drive shafts of a plurality of cutting units spaced along the length of the cutter bar 30. For details of the cutter bar 30, reference may be had to U.S. Pat. No. 5,012,635, issued to Walters et al. on May 7, 1991, which is incorporated herein, in its entirety, by reference.

Figure 5:
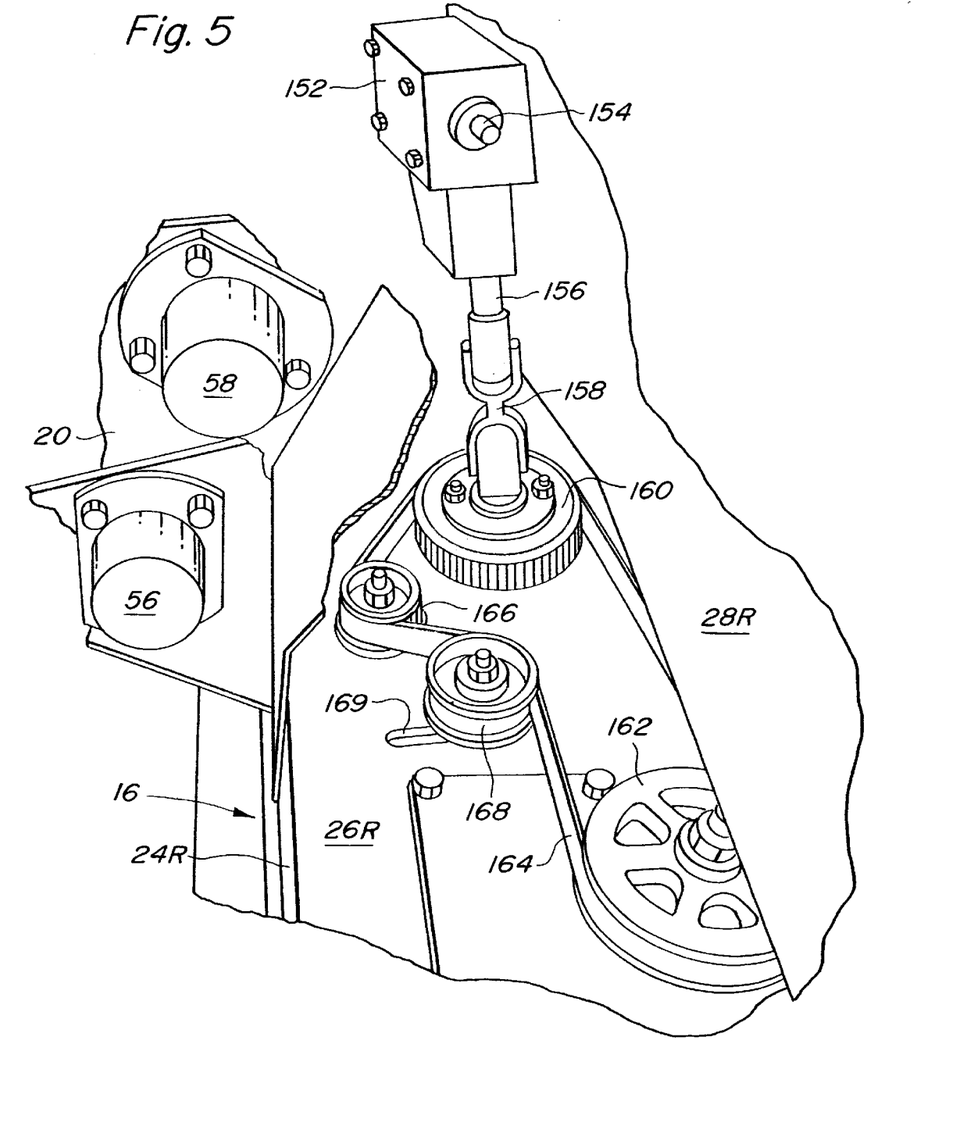
FIG. 5 is a right rear perspective view of that portion of the drive arrangement for driving the right-hand set of converging drums.
Figure 7:
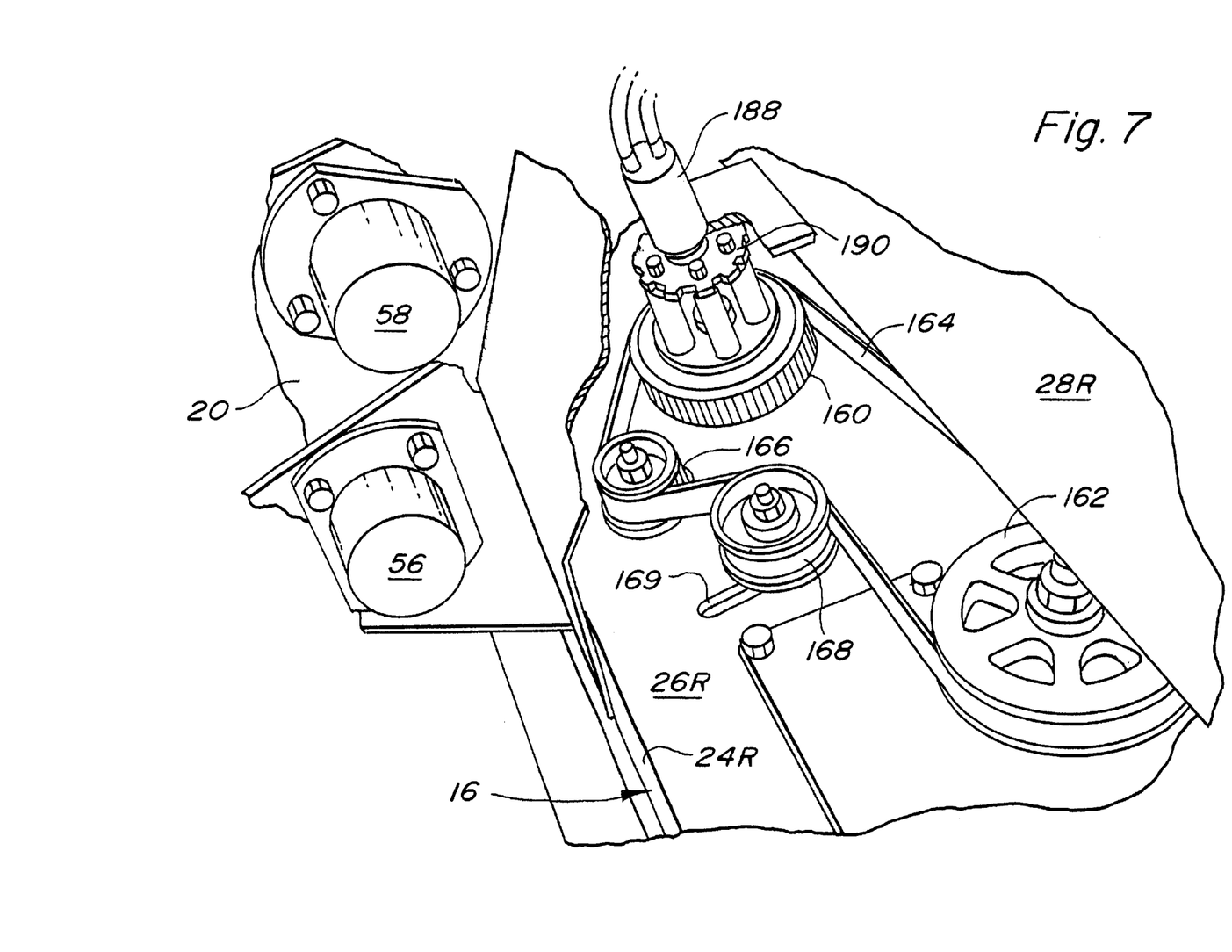
FIG. 7 is a right side perspective view showing the hydraulic motor of the alternate drive arrangement coupled for diving the inner pair of converging drums of the right-hand set of converging drums.

Left-hand and right-hand sets of three cutting units are respectively provided at the opposite ends of the cutter bar 30 with each set including an end or outer cutting unit 34, a middle cutting unit 36 and an inner cutting unit 38 all rotating so as to deliver crop material towards the discharge passage 22 at the center of the platform. Accordingly, as viewed from the top, respective oval-shaped, blade-equipped cutting discs 40, 42 and 44 of the three cutting units at the left-hand end of the cutter bar 30 all rotate clockwise, while the three discs at the right-hand end of the cutter bar 30 rotate counterclockwise. A roll-type crop conditioner 46 is mounted across the discharge opening 22 for receiving crop delivered by the cutting units of the cutter bar 30, the conditioner 46 including lower and upper conditioner rolls 48 and 50, respectively. The rolls 48 and 50 could be of any desired construction for effecting crimping and/or crushing of crop stems, but are here shown as a type including a plurality of longitudinal flutes welded to a cylindrical metal core (not shown) having circular plates welded at the interior of its opposite ends, with the lower roll 48 having right- and left-hand stub shafts 52 fixed to and projecting outwardly from associated ones of the circular plates and rotatably received in bearings mounted to the left- and right-hand inner walls 18 and 20, and with the upper roll 50 having opposite ends similarly provided with left- and right-hand stub shafts 54. The right-hand stub shaft 52 of the lower conditioner roll 48 is rotatably received in a bearing housing 56 (FIGS. 5 and 7) that is mounted to the right-hand inner side wall 20. The stub shafts 54 at the opposite ends of the upper conditioner roll 50 project through vertically elongated openings (not shown) provided in the inner side walls 18 and 20, and are rotatably received in respective bearings carried by housings mounted to respective arms (not shown) pivotally mounted to the walls 18 and 20 for permitting the upper roll 50 to move toward and away from the lower roll 48 in response to variations in the thickness of a mat of crop passing between the rolls 48 and 50. Springs (not shown) normally yieldably bias the arms against downstops (not shown). The right-hand stub shaft 54 is located in a bearing housing 58 (FIGS. 5 and 7).

A main power distribution gear box 60 includes a housing 62 located vertically above the left-hand end cutting unit 34. A power shaft 64 extends vertically through the housing 62 and has an upper input end coupled to a power source in the form of a reversible hydraulic motor 66. The power shaft 64 is coupled, through right-angle gearing (not shown), for driving a horizontal, leftward extending output shaft 68. A lower end of the power shaft 64 is connected, by a universal coupler 70 (FIG. 3), with an inlet shaft, not visible, of the cutting unit 34. This inlet shaft carries a gear which is coupled for rotating the end cutter disc 40 and is meshed for distributing power through a constant mesh gear train that supplies power for rotating the remaining cutter discs of the cutter bar 30.

Figure 4:
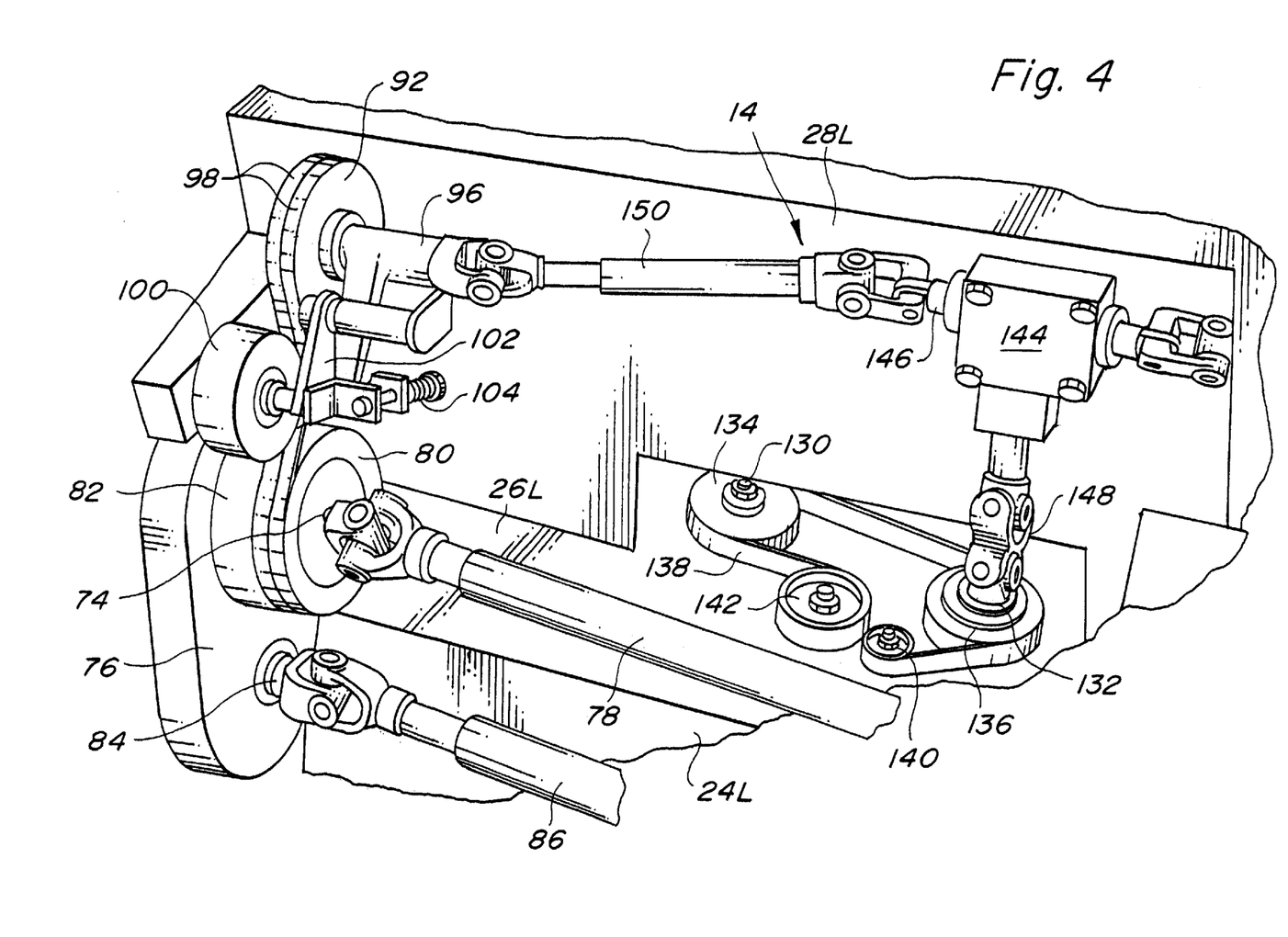
FIG. 4 is a right rear perspective view of the drive arrangement located at the left end portion of the mower-conditioner platform for driving the converging drum arrangement and the conditioner rolls.

Fixed for rotation with the output shaft 68 is a multiple groove belt pulley 72. Referring now also to FIG. 4, it can be seen that mounted in approximate axial alignment with the upper conditioner roll stub shaft 54 is an upper shaft 74 which is mounted in, and projects to the right from, a conditioner roll drive gear housing 76 mounted to a left end portion of the bulkhead upright wall section 24L. An upper, telescopic drive shaft 78 has its opposite ends respectively universally coupled to the shaft 74 and the left-hand stub shaft 54 of the upper crop conditioning roll 50. Mounted to the shaft 74 in fore-and-aft alignment with the pulley 72 is a multiple groove v-belt pulley 80 having two more grooves than the pulley 72. A banded v-belt 82 extends between the pulleys 72 and 80. A lower shaft 84 is mounted in, and projects to the right from, the gear housing 76 in general alignment with the left-hand stub shaft 52 of the lower conditioner roll 48. A lower drive shaft 86 has its opposite ends respectively universally coupled to the lower shaft 84 and the left-hand stub shaft 52 of the lower conditioner roll 48. Located in the gear housing 76 and respectively fixed to the upper and lower shafts 74 and 84 are upper and lower, constantly meshed spur gears 88 and 90.

As viewed in FIG. 1, the output shaft 68 of the power distribution gear box 60 rotates counterclockwise resulting in the upper conditioner roll 50 being likewise rotated counterclockwise. This rotation is in turn transferred through the gears 88 and 90 so as to cause the lower conditioner roll 48 to be rotated clockwise.

A double groove v-belt pulley 92 is mounted to the upper vertical section 28L of the bulkhead 14 at a location aligned fore-and-aft with, and spaced upwardly and forwardly from the outer two grooves of the pulley 82. The pulley 92 is fixed to the left-hand end of a shaft 94 that is journalled for rotation in a sleeve 96. A pair of v-belts 98 extend about the pulleys 80 and 96 and are kept properly tensioned by an idler pulley 100 carried by an arm 102 that is biased downward by a spring assembly 104. Thus, it will be appreciated that the shaft 94 is driven at a speed which has a direct relationship to the speed that the cutting discs and crop conditioning device are driven.

Provided for augmenting the rotating cutter discs in conveying cut crop into the passage 22 for further processing by the conditioner rolls 48 and 50 are right and left-hand converging drum sets, with only the left-hand set 106 being shown. As can best be seen in FIGS. 2 and 3, the left-hand converging drum set 106 includes outer or end, intermediate and inner converging drums 108, 110 and 112, respectively. As can be seen in FIG. 2, the intermediate converging drum 110 is set back slightly from a line A which is tangent to a front location of the outer and inner converging drums 108 and 112 and also from a line of centers C passing through the axes of rotation of the outer and intermediate cutting discs 34 and 36, respectively. It has been found that this set back of the intermediate drum 110 results in better crop convergence as this gives extra space for the cut crop coming off the outer cutting disc 34 so that the cut crop is not urged forward by the rotating drum 110 to the extent that uncut crop is pushed down resulting in a streak of taller stubble than is left along the remainder of the cutter bar 30. It has been found that in some crop conditions and/or cutterbar lengths that only the drum 110 is needed for improving crop convergence.

Each of the converging drums 108, 110 and 112 includes top and bottom, vertically spaced, circular plates 114 joined by four vertical angle members 116 spaced equal about the respective axes of rotation of the drums, it being noted that the lower plate 114 of the outer drum 108 is fixed for rotation with the cutting disk 40. Closing the gaps between the angle members 116 of each of the intermediate and inner converging drums 110 and 112 are respective plates 118, which each have a vertically extending angle formed between opposite end portions that are engaged with and bolted to legs of the adjacent ones of the angle members 116. Thus, the drums 110 and 112 are completely enclosed, to lessen the tendency to grab and wrap crop, and provide eight corners for agressively engaging crop.

Figure 3:
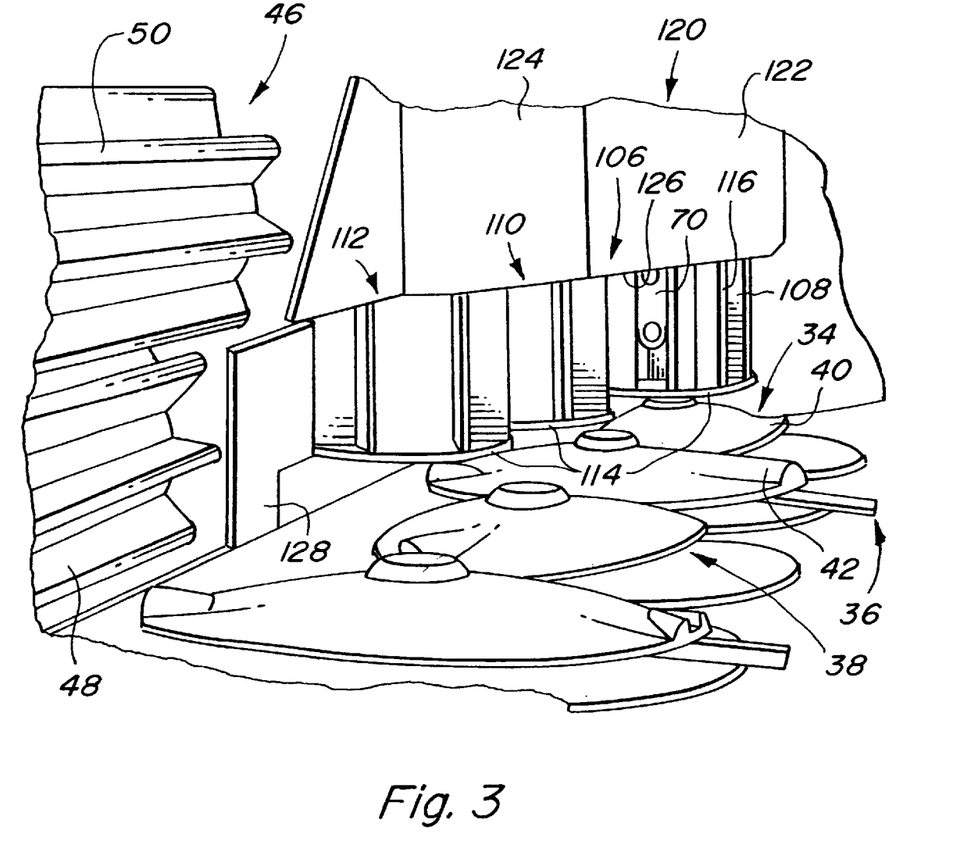
FIG. 3 is a right front perspective view of the left end portion of the cutter bar with the left-hand set of converging drums.

Further enhancement of the converging function is provided by right- and left-hand crop converging or guide shields respectively associated with the right- and left-hand converging drum sets, with only the left-hand shield 120 being shown (see FIGS. 2 and 3). The guide shield 120 is in the form of a vertical sheet having, as can be seen in FIG. 2, a transverse outer section 122, extending inwardly from the outer side wall 12 in general tangential relationship to, and terminating at a front surface of the outer crop converging drum 108. An inner section 124 is joined to, and angled inwardly and to the rear from, the outer section 122 to a location of the front vertical upper section 28L of the bulkhead 14 that is spaced a short distance outward from the inner side wall 18. The guide shield 120 has a substantially horizontal lower edge 126 disposed at a height just below the tops of the converging drums 108, 110 and 112 so that the shield 120 acts to strip crop tending to flow above the drums. Extending from the inner converging drum 112 to the crop discharge passage 22 is a stripper plate 128 having an outer edge disposed closely adjacent the outer periphery of the inner converging drum 112 and a bottom edge engaged with the top of the cutter bar 30. The stripper plate 128 is mounted to the bulkhead section 28L in a location free from the paths of rotation of the knives of the cutter discs 42 and 44.

Referring now also to FIG. 4, it can be seen that vertical drive shafts 130 and 132 are respectively fixed to a central location of the upper circular plates 114 of the intermediate and inner drums 110 and 112, the shafts 130 and 132 projecting upward through the horizontal section 26L of the bulkhead 14. Mounted to the upper ends of the shafts 130 and 132 are drive pulleys 134 and 136, respectively, that are toothed and engaged by a toothed drive belt 138 extending about them. The drive belt 138 is kept properly tensioned by a toothed first idler pulley 140 engaged with the inner or toothed side of the belt at a location to the rear and left of the drive pulley 136. A second idler pulley 142 has a smooth groove engaged with the outer or smooth side of the belt 138 at a location spaced slightly to the left and forward of the first idler pulley 140. Both of the idler pulleys 140 and 142 are mounted for rotating about upright shafts fixed to the horizontal section 26L of the bulkhead 14, with the shaft of the pulley 142 being adjustable along a fore-and-aft extending slot (not shown) provided in the horizontal bulkhead section 26L.

Mounted to the upright bulkhead section 28L at a location spaced vertically above the drive shaft 132 is a gear box 144 through which extends a horizontal drive shaft 146. Right angle gearing (not shown) couples the shaft 146 to an output shaft (not visible) having its lower end coupled to the converging drum drive shaft 132 by a connecting shaft 148 having universal couplers at its opposite ends. The right angle gearing is arranged so as to cause the converging drums 110 and 112 to be driven clockwise, as viewed from the top in FIG. 2. Power is transferred from the pulley 92 to the gear box 144 by a telescopic power transfer shaft 150 having its left- and right-hand ends respectively coupled to the shafts 94 and 146 by universal couplers.

Referring now to FIG. 5, there is shown the arrangement for driving the intermediate and inner converging drums (not shown) of the left-hand converging drum set. Specifically, a gear box 152, of a construction similar to that of the gear box 144, is mounted to the vertical section 28R of the bulkhead 16 at a location spaced vertically above a drive shaft (not visible) of an inner converging drum (not shown) of the right-hand converging drum set. A drive shaft 154 extends horizontally through the gear box 152 and right angle gearing (not shown) is arranged for transferring power from the shaft 154 to a vertical output shaft 156 so as to cause the latter to be rotated counterclockwise, as viewed from the top. A connecting shaft 158, having universal couplers at its opposite ends, is coupled between the output shaft 156 and the drive shaft (not visible) of the inner converging drum. Respectively mounted to the drive shafts of the inner and intermediate converging drums are cog drive pulleys 160 and 162. A cog drive belt 164 extends about, and is engaged with, the teeth of the pulleys 160 and 162, and is maintained in proper tension by a toothed, first idler pulley 166 mounted for rotation about a shaft fixed to the bulkhead horizontal section 26R at a location spaced to the right and to the rear of the drive pulley 160. A second idler pulley 168 is mounted for rotation about a shaft located in a fore-and-aft adjustment slot 169 (see FIG. 7) provided in the bulkhead section 26R at a location just to the right and forward of the idler pulley 166. A power transfer shaft (not shown) having universal couplers at its opposite ends is coupled between the right-hand end of the shaft 146 located in the gear box 144 (FIG. 4) and the left-hand end of the shaft 154 located in the gear box 152.

The operation of the embodiment thus far described is stated below. Normal cutting operation of the platform 10 is initiated by controlling the motor 66 such that its output shaft rotates in a forward, clockwise direction, as viewed from the top, resulting in clockwise rotation of the outer cutter disc 40. The gear train contained in the cutter bar 30 is arranged in a well known manner so as to result in the cutter discs 42 and 44 being driven so that they also rotate clockwise and so as to drive the outer three cutter discs on the left-hand end portion of the cutter bar 30 such that they rotate counterclockwise, whereby cut crop is delivered towards the roll conditioner 46 located in the crop discharge passage 22 at the center of the platform 10.

This centering of the cut crop is aided by the right- and left-hand converging drum sets in conjunction with the right- and left-hand converging or guide shields. Specifically, with respect to the left-hand converging drum set 106 and shield 120, the outer drum 108 is driven clockwise with the cutting disc 40 while the intermediate and inner drums 110 and 112 are driven clockwise through operation of the drive which, as can be seen in FIGS. 1 and 4, includes the belt 82 that transfers power from the main power distribution gear box 60 to the input shaft of the conditioner roll drive gear housing 76 and the pair of belts 98 which transfer power to the shaft 94 that is, in turn, coupled to the shaft 146 of the gear box 144 that is connected for driving the inner converging drum 112, the shaft 146 being coupled to the shaft 154 of the gear box 152 that is coupled for driving the inner converging drum of the left-hand converging drum set (not shown). The toothed or cog drive belts 138 and 164 are respectively coupled for driving the intermediate converging drum 110 of the left-hand converging drum set 106 and the intermediate drum of the right-hand converging drum set. Thus, it will be appreciated that the sets of converging drums are driven at a speed which is related to the speed at which the cutting discs and conditioning rolls 48 and 50 are driven.

With respect to the left-hand converging drum set 106, the height of the converging drums 108, 110 and 112 cooperate with the set back of the intermediate drum 110 from the tangent line A to cause the cut crop to flow to the discharge opening 22 without bunching to the extent that it causes uncut crop to be pushed down and cut such as to leave a streak of taller stubble than would occur if the crop had not been pushed down. Further, crop is kept out of the zone behind the converging drum set 106 by the cooperative stripping action of the lower portion of the converging shield 120, which prevents crop from going over the tops of the converging drums, and the stripper plate 128, which strips crop from the inner converging drum 112. Of course, the right-hand converging drum set and converging shield operate in a similar fashion.

Figure 6:
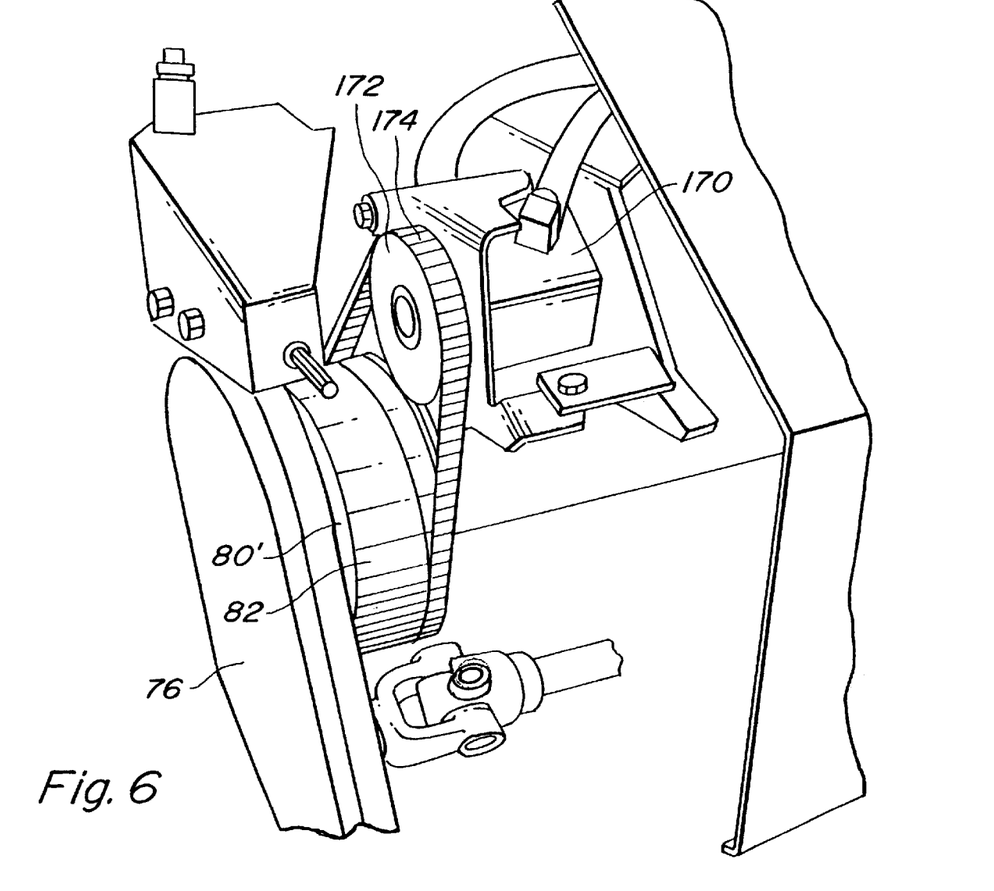
FIG. 6 is a left rear perspective view of an alternate drive arrangement embodiment showing the drive for a hydraulic pump forming part of a hydrostatic drive for the inner pair of converging drums of each of the right and left-hand sets of converging drums.
Figure 8:
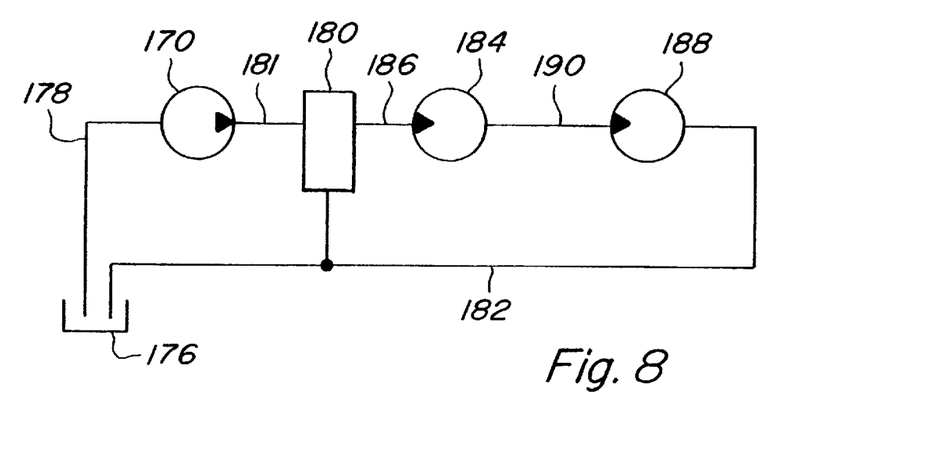
FIG. 8 is a schematic hydraulic circuit showing an alternate drive arrangement.

An alternative to the drive arrangement for directly driving the inner and intermediate drums of each of the right-and left-hand converging drum sets is disclosed in FIGS. 6, 7 and 8, where collectively, there is shown a hydraulic drive system. Specifically, referring now to FIG. 6, it can be seen that the drive belt 82 is engaged with a pulley 80' having only a single v-groove at its inner end. A fixed displacement hydraulic pump 170 is mounted at a height above, and has a pulley 172 located in alignment with, the v-groove of the pulley 80'. A v-belt 174 transfers the rotation of the pulley 80' to the pump 170. Referring now also to FIGS. 7 and 8, it can be seen that the pump 170 includes an inlet port coupled to a reservoir 176 by a conduit 178, and an outlet port coupled to an inlet of a control valve 180 by a conduit 181. The control valve 180 is a metering valve, which may be of any remotely controllable type. The valve 180 has a bypass port coupled to the sump 176 by a branched return conduit 182 and a work port coupled to a first fixed displacement motor 184 by a supply conduit 186. The first motor 184 is coupled in series with a second fixed displacement motor 188 and, thus, has its outlet coupled to the inlet of the motor 188 by a conduit 190, the outlet of the second motor 188 being coupled to the reservoir 176 by the return conduit 182. The speed of the motors 184 and 188 may be selected by operation of the valve 180. In FIG. 7, it can be seen that the second motor 188 is mounted directly to the toothed pulley 160 of the drive for the intermediate and inner converging drums of the right-hand converging drum set. The first motor 184 would similarly be mounted to the pulley 136 of the drive for the intermediate and inner converging drums of the left-hand converging drum set 106. A toothed plate 190 is used as part of the structure coupling the motor 188 to the pulley 160, and an electrical or electromagnetic speed sensor (not shown) may be disposed such that, as the teeth of the plate 190 rotate past it, electrical pulses occur which are converted and sent to a speed indicator located for viewing by an operator so that he may adjust the control valve 180, if necessary, to obtain a desired speed of operation.

What is claimed is:

1. A converging drum for use with a crop harvesting platform, comprising: first and second horizontal, vertically spaced circular plates centered on an axis of rotation of said drum; a plurality of angle members extending between and having opposite ends respectively fixed to said upper and lower circular plates at locations spaced equally about said axis; each angle member having a pair of legs diverging from a corner extending between peripheral locations of, and opening toward said rotational axis of, said first and second circular plates; a gap being defined between adjacent legs of adjacent angle members; a gap-filling plate member being located in each gap and having a pair of opposite, upright marginal portions overlapping, and being secured to, said adjacent legs of adjacent angle members; and each plate member being formed so as to define an angular portion located halfway between said opposite upright marginal portions so as to define a corner which extends parallel to and is halfway between the corners of adjacent ones of said angle members, the plate members thus cooperating with said angle members and circular plates to define an enclosure which reduces the tendency for crop to get caught by and wrap about the converging drum.

2. The converging drum as defined in claim 1 wherein the converging drum includes at least four angle members and four plate members so that the corners of these members define eight crop engaging ribs.

3. The converging drum as defined in claim 1 wherein said legs of said angle members meet so as to form a right angle corner.

* * * * *